United States Patent
Locke et al.

(10) Patent No.: US 7,516,649 B2
(45) Date of Patent: Apr. 14, 2009

(54) SYSTEM AND METHOD FOR DETERMINING DUCT LEAKAGE AND FAN FLOW EFFICIENCY

(76) Inventors: Bobby L. Locke, 1704 W. Ross Rd., El Centro, CA (US) 92243; John E. Faircloth, 4847 Colonial Ave., Jacksonville, FL (US) 32210

(*) Notice: Subject to any disclaimer, the term of this patent is extended or adjusted under 35 U.S.C. 154(b) by 187 days.

(21) Appl. No.: 11/371,060

(22) Filed: Mar. 8, 2006

(65) Prior Publication Data

US 2007/0209426 A1 Sep. 13, 2007

(51) Int. Cl.
*G01M 3/08* (2006.01)
(52) U.S. Cl. .............. 73/49.1; 73/40; 73/86; 73/1.07; 454/237; 454/238; 454/251
(58) Field of Classification Search .......... 73/49.1, 73/40, 861.07; 454/237, 238, 251
See application file for complete search history.

(56) References Cited

U.S. PATENT DOCUMENTS

| | | | | | |
|---|---|---|---|---|---|
| 4,702,412 | A | * | 10/1987 | Zelczer et al. | 236/46 R |
| 6,128,910 | A | * | 10/2000 | Faircloth | 62/129 |
| 2004/0253918 | A1 | * | 12/2004 | Ezell et al. | 454/239 |
| 2006/0154371 | A1 | * | 7/2006 | Organiscak et al. | 436/3 |

* cited by examiner

*Primary Examiner*—Hezron Williams
*Assistant Examiner*—Gunnar J Gissel
(74) *Attorney, Agent, or Firm*—Nydegger & Associates

(57) ABSTRACT

A system and method for determining "real time" air leakage from a duct involves an airflow meter for taking airflow measurements at the inlet and at the outlet of the duct. Also included is a base fan that operates in three different modes to simultaneously vary an enclosure pressure at the inlet and outlet. This is done while a duct fan, inside the duct, is operated to continuously move air through the duct. A comparison of airflow measurements at the inlet, or at the outlet, under the three base fan operational modes will respectively identify whether leaks are present in the duct, upstream or downstream from the duct fan.

6 Claims, 2 Drawing Sheets

SYSTEM AND METHOD FOR DETERMINING DUCT LEAKAGE AND FAN FLOW EFFICIENCY

FIELD OF THE INVENTION

The present invention pertains generally to systems and methods for detecting air leaks in a duct. More particularly, the present invention pertains to systems and methods for inspecting or monitoring ventilation ducts for air leaks in HVAC installations. The present invention is particularly, but not exclusively, useful for evaluating air leakages in the ducting of an HVAC installation, in real time, while the HVAC installation is operating.

BACKGROUND OF THE INVENTION

It is well known that pressure differentials in an air mass will cause air to flow from a point of relatively higher pressure, to a point of relatively lower pressure. Further, it is well known that this airflow is predictable when the flow path between the points is confined, such as by a duct. It cannot, however, always be assumed that a confined airflow system, such as HVAC, is not somehow compromised, or otherwise diminished in its efficiency. One way to inspect, monitor and evaluate the efficiency of an airflow system in this regard is to determine whether there are any air leaks in the ducting of the system.

In a typical HVAC system, air is circulated to and from an enclosure through a duct. Specifically, for this circulation, the duct is intended to provide a fluid pathway that is separate from the enclosure, and that extends between an inlet and an outlet. More specifically, air from the enclosure enters the duct through the inlet, and is returned to a unit in the duct (e.g. an air conditioner). Subsequently, after being conditioned or processed by the unit, the air is re-supplied to the enclosure through the outlet of the duct. Regardless what the exact nature of the unit in the duct may be (e.g. a duct fan), there is always some means in the unit that is used to move air through the duct from an inlet to an outlet. With such structure, the duct is effectively divided into a return duct (which extends from the inlet to the fan), and a supply duct (which extends from the fan to the outlet). Also, with such structure, it happens that different pressure conditions in the enclosure can be created to test the physical integrity of both the return duct and the supply duct. Specifically, this can be done by taking appropriate airflow measurements at the inlet and at the outlet of the duct.

For purposes of this disclosure, consider the duct fan is operating in an "on" condition. Airflow through the duct will then be a direct function of the duct fan's efficiency. Also, this airflow will have a value that is measurable. With this in mind, further consider the enclosure. Specifically, consider that air pressure in the enclosure can be somehow changed (e.g. by a base fan) from an ambient pressure condition to either a "positive" overpressure condition, or a "negative" under pressure condition.

With the possible pressure differentials mentioned above, first consider only the return duct (i.e. from inlet to duct fan). If there are no leaks in the return duct, the airflow measurement through the duct inlet will remain substantially constant under all pressure conditions. This is so because airflow into the duct is determined by the efficiency of the duct fan, and is possible only through the inlet. A similar consequence, for the same reasons, results for the supply duct when there are no leaks in the supply duct. The situation changes, however, when there are leaks in either the return duct, the supply duct or both.

In contrast with the no-leak condition discussed above, consider the condition where there is a leak in the return duct under an ambient pressure condition in the enclosure. In this case, with the duct fan "on", airflow through the duct inlet will be less than it would be for a no-leak condition. This is so because additional air is being pulled into the duct through the leak. Now consider a condition wherein there is still a leak in the return duct, but a positive overpressure is created in the enclosure. This overpressure will cause the airflow into the duct inlet to increase. At the same time, because airflow through the duct fan remains substantially constant, the inflow of air through the leak will be diminished. On the other hand, when a negative under pressure is created in the enclosure, the reverse will happen. A decreased airflow through the duct inlet will cause the inflow of air through the leak to increase, in order to maintain the same duct fan airflow.

Using a similar analysis for the supply duct, it can be shown that when there is a leak in the supply duct, a predictable variation in airflow through the outlet results. As before, when it is "on", the duct fan will establish a same airflow through the duct fan, regardless whether there is a leak in the supply duct. Under an ambient pressure condition in the enclosure, however, airflow from the outlet with a supply duct leak will be more than it would be for a no-leak condition. This happens because additional air is entering the supply duct through the leak. With a positive overpressure in the enclosure, however, airflow through the duct outlet will decrease while, at the same time, the outflow of air through the leak will increase. On the other hand, if a negative under pressure is applied in the enclosure, an increased airflow through the duct outlet will result and the outflow of air through the leak will be decreased.

In light of the above, it is an object of the present invention to provide a system and a method for determining air leakage in "real time" in a duct, while the duct is operationally in use. Another object of the present invention is to provide a system and a method for determining air leakage in a duct without physically altering the duct during the text and evaluation procedure. Still another object of the present invention is to provide a system and a method for determining air leakage in a duct that is relatively simple to manufacture, is easy to use, and is comparatively cost effective.

SUMMARY OF THE INVENTION

In accordance with the present invention, a system and method are disclosed for determining air leakage from a duct, in real time (i.e. while the duct is in operational use). As envisioned for the present invention, both ends of the duct are connected in fluid communication with an enclosure. More specifically, the duct has an inlet and an outlet that are exposed to the enclosure and are thereby in fluid communication with the enclosure. Also, a duct fan is positioned in the duct between the inlet and the outlet for moving air through the duct. With this configuration, the duct fan effectively divides the duct into a return duct that is located between the inlet and the duct fan, and a supply duct that is located between the duct fan and the outlet.

An important aspect of the present invention is the use of an airflow meter, or meters, for measuring airflow from the enclosure, through the duct inlet and into the return duct, "$f_r$". These same meters are also used for measuring airflow through the duct outlet from the supply duct, "$f_s$", and into the enclosure. As intended for the present invention, these airflow measurements at the duct inlet and duct outlet are taken under varying pressure conditions, and they are then used to determine and evaluate air leakage from the duct. Further, the system includes a pressure sensor, or pressure sensors, for measuring air pressures at selected locations: such as, a return air pressure in the return duct immediately upstream from the duct fan "$P_r$". Also included in the system of the present invention is a base fan that is positioned for fluid communication between the enclosure and outside the duct/enclosure. For purposes of the present invention, the base fan can be selectively operated to create either a positive overpressure (+) in the enclosure, or a negative under pressure (−) in the enclosure.

In the operation of the present invention, airflow measurements are taken under three distinct pressure conditions. These conditions are established by the operation of a base fan, and are: an initial condition with ambient pressure in the enclosure (i.e. when the base fan is "off"), and a first condition and a second condition (when the base fan is "on"). Importantly, the duct fan that is located inside the duct is "on" in all three conditions. In the initial condition (i.e. the duct fan is "on" and the base fan is "off"), airflow measurements for "$f_r$" and "$f_s$" are respectively taken at the duct inlet and the duct outlet, under an ambient pressure condition in the enclosure. Once these initial readings are taken, the base fan is successively activated to establish the first condition and the second condition in the enclosure.

The purpose of the first condition is to establish an overpressure in the enclosure with a positive pressure (+). Airflow meter(s) are then used, in this first condition, to measure $f_{r+}$ and $f_{s+}$ for subsequent use. The purpose of the second condition is to establish an under pressure in the enclosure with a negative pressure (−). Again, airflow meter(s) are used. In this second condition, however, they will measure $f_{r-}$ and $f_{s-}$.

Once the airflow readings have been obtained as disclosed above, they are compared with each other to determine whether there is an air leakage for the duct (i.e. both the supply duct and the return duct). Specifically, a substantially leak-free duct is identified when the following relationships are approximately established: $f_r = f_s$ and $f_{r+} = f_{s+}$ or, $f_{r-} = f_{s-}$. On the other hand, a leak is identified in the return duct, between the duct inlet and the duct fan, when $f_{r-} < f_r < f_{r+}$. Stated differently, a leak in the return duct can be identified when an increase or decrease in airflow through the inlet of the duct corresponds to a respective increase or decrease in pressure in the enclosure. Similarly, a leak is identified in the supply duct, between the duct fan and the duct outlet, when $f_{s+} < f_s < f_{s-}$. Again, stated differently, a leak in the supply duct can be identified when an increase or decrease in airflow through the outlet of the duct corresponds to a respective decrease or increase in pressure in the enclosure. It follows there will be leaks in the duct both upstream from the duct fan and downstream from the duct fan when $f_{r-} < f_r < f_{r+}$ and $f_{s+} < f_s < f_{s-}$, respectively.

The airflow measurements considered above can also be used to calculate a fan airflow value "$F_r$". To do this, a pressure sensor is used to measure a return air pressure in the duct immediately upstream from the duct fan, "$P_r$". A pressure sensor is also used for measuring an air pressure at the inlet of the return duct with the base fan "off", "$p_r$". An air pressure at the inlet of the return duct is also measured with an overpressure condition, "$p_{r+}$". The return duct inlet pressures, $p_r$ and $p_{r+}$ are then extrapolated with the return air pressure, "$P_r$", in the return duct immediately upstream from the duct fan to obtain corresponding airflow measurements $f_r$ and $f_{r+}$ and a fan airflow value "$F_r$".

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which.

DESCRIPTION OF THE PREFERRED EMBODIMENTS

Figure 1:
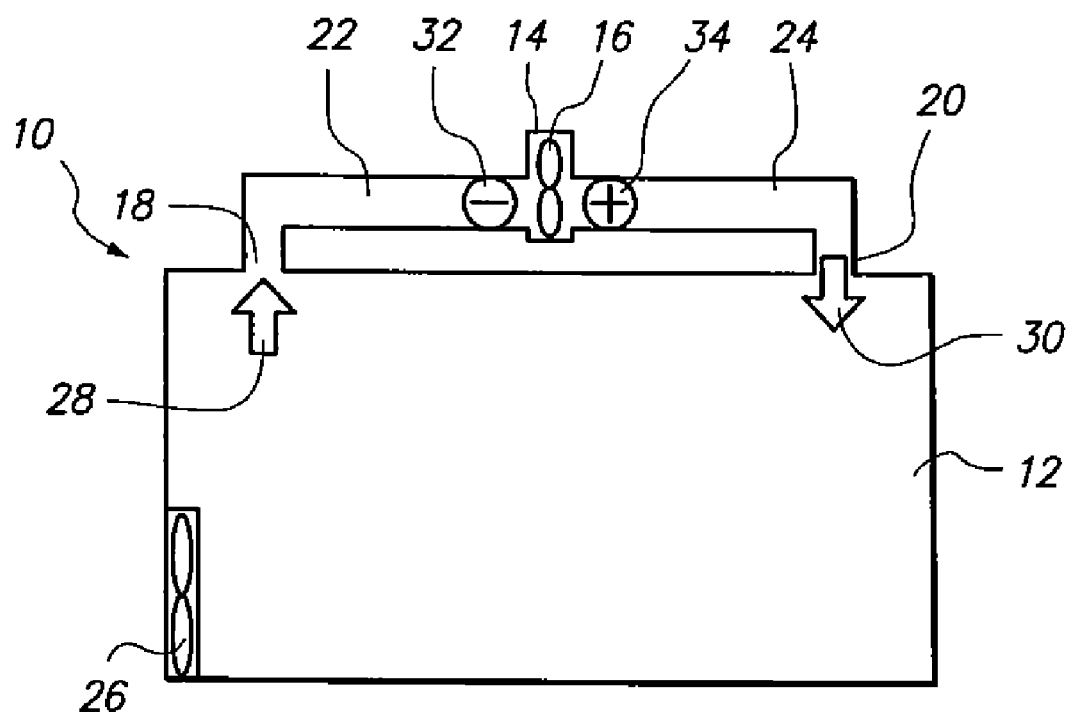
FIG. 1 is a schematic drawing of a system in accordance with the present invention, showing an enclosure that is serviced by an airflow duct.

Referring initially to FIG. 1, a system in accordance with the present invention for determining "real time" air leakage from a duct is shown and is generally designated 10. As shown in FIG. 1, the system 10 includes an enclosure 12 that is serviced by a duct 14. Further, as is common for systems such as the system 10, a duct fan 16 is positioned in the duct 14 somewhere between an inlet 18 and an outlet 20. The general purpose of the duct fan 16 is to return air from the enclosure 12 through the inlet 18 to the duct fan 16, and to supply air to the enclosure 12 through the outlet 20. As envisioned for the present invention, however, the duct fan 16 can function alone or as a component of an appliance (e.g. an air conditioning unit—not shown).

With the configuration of components as shown in FIG. 1, it will be seen that the duct 14 is effectively bifurcated by the duct fan 16. Specifically, the positioning of the duct fan 16 in the duct 14 effectively defines a return duct 22 that extends from the inlet 18 to the duct fan 16. It also defines a supply duct 24 that extends from the duct fan 16 to the outlet 20. Additionally, FIG. 1 shows that the system 10 includes a base fan 26 which is directly associated with the enclosure 12, but separated from the duct 14. When so located, the base fan 26 is positioned to selectively create either an overpressure (+) or an under pressure (−) in the enclosure 12. The operational effect of the base fan 26 on airflow through the duct 14 is evinced at the inlet 18, and at the outlet 20.

Still referring to FIG. 1, it will be seen that the system 10 also includes an airflow meter 28 that can be positioned at the inlet 18. Also shown is an airflow meter 30 that can be positioned at the outlet 20. For purposes of this disclosure, the respective airflow meters 28 and 30 are displayed as arrows that indicate the operational direction of airflow through the meter 28/30 and, hence, through the inlet 18 or the outlet 20. Although the implication with this designation is that there are two such meters 28/30, as a practical matter, a same airflow meter can be used alternatively for both purposes. Further, FIG. 1 also shows that the system 10 includes a pressure sensor 32 that is positioned upstream from the duct fan 16, and a pressure sensor 34 that is positioned downstream from the duct fan 16. Similar to the airflow meters 28/30, the pressure sensors 32/34 can actually be a same pressure sensor that is alternatively use for both purposes. Specifically, the circled "−" for pressure sensor 32 indicates it will measure a lower pressure upstream from the duct fan 16, than will the pressure sensor 34 which is represented by the circled "+" and will measure a higher pressure downstream from the duct fan 16.

Operation

In the operation of the system 10 of the present invention, the duct fan 16 is turned "on", and it remains "on". Thus, a "real time" evaluation for the operational integrity of the duct 14 can be made. With the duct fan 16 "on", the evaluation of the duct 14 is made with the base fan 26 operated in three separately distinct operational modes. These include: a first mode wherein the base fan 26 is "off". This first mode corresponds to an ambient pressure condition in the enclosure 12. In a second mode, the base fan 26 is turned "on" with its flow directed into the enclosure 12. This second mode corresponds to an overpressure condition (+) in the enclosure 12. Finally, in the third mode, the base fan 26 is still "on", but airflow from base fan 26 is directed out of the enclosure 12. Specifically, this is done to create an under pressure condition (−) in the enclosure 12.

Figure 2A:
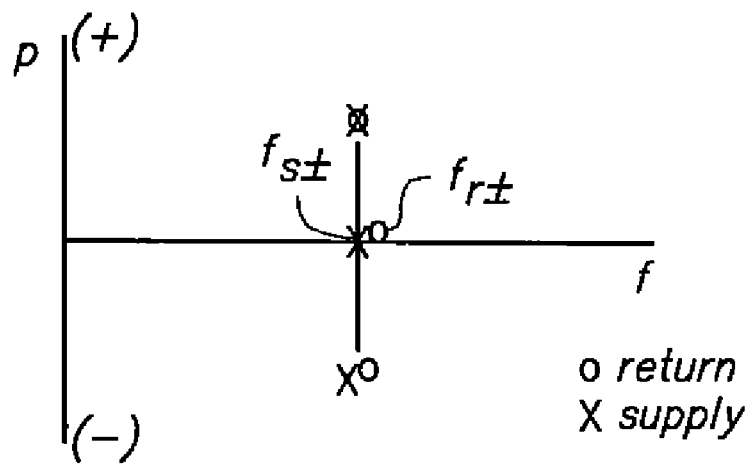
FIG. 2A is a graph showing variations in airflow through the inlet and the outlet of a duct, in response to pressure changes in the enclosure that is serviced by the duct, when there are no leaks in the duct.

Referring now to FIG. 2A, a graph that compares airflow, "f", to air pressure in the enclosure 12, "p", is shown. Specifically, FIG. 2A shows plots of "f" (measured by airflow meter 28), and "p" (measured by airflow meter 30) for a condition wherein there are no leaks in the duct 14. Under this "no leak" condition, it can be shown that regardless whether there is an overpressure in the enclosure 12 [i.e. p(+)], or an under pressure in the enclosure 12 [i.e. p(−)] the airflow through the inlet 18 [i.e. $f_r$] and the airflow through the outlet 20 [i.e. $f_s$] remain substantially constant. Stated differently, as shown in FIG. 2A, a "no leak" condition in the duct 14 will be determined when $f_s = f_r$ and $f_{r\pm} = f_{s\pm}$, respectively.

Figure 2B:
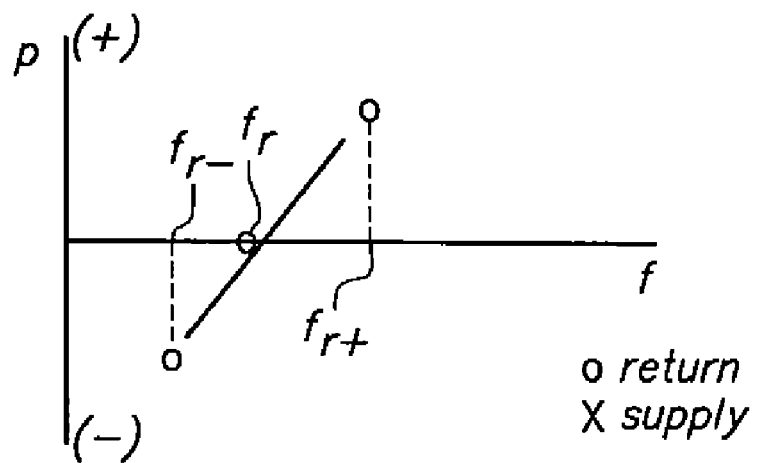
FIG. 2B is a graph showing variations in airflow through the inlet and the outlet of a duct, in response to pressure changes in the enclosure that is serviced by the duct, when there is a leak in the duct between the inlet and a duct fan.

FIG. 2B shows a graph of airflow measurements through the inlet 18 when there is a leak somewhere in the return duct 22. To detect this condition the airflow meter 28 is used to measure the return airflow at the duct inlet 18. This is done with the base fan 26 selectively operated in its three different modes of operation. As shown in the FIG. 2B, when the base fan 26 is "off" (i.e. the first mode) an ambient pressure condition is created in the enclosure 12 and "p" is neither + nor −. In this case, the airflow through inlet 18 will be measured as "$f_r$". With an overpressure (+) in the enclosure 12 (i.e. the second mode for base fan 26), there will be an airflow measurement of $f_{r+}$, at the inlet 18. On the other hand, with an under pressure (−) in the enclosure 12 (i.e. base fan 26 operating in its third mode), the airflow measurement will be $f_{r-}$, at the inlet 18. A leak in the return duct 22, between the duct inlet 18 and the duct fan 16 will then be identified when $f_{r-} < f_r < f_{r+}$.

Figure 2C:
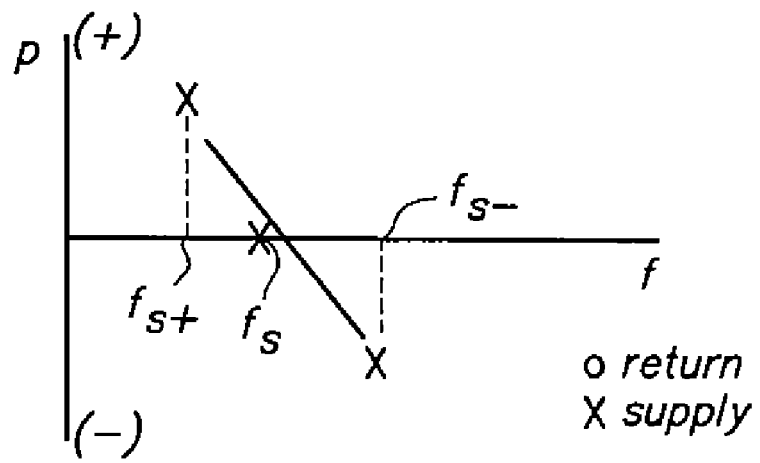
FIG. 2C is a graph showing variations in airflow through the inlet and the outlet of a duct, in response to pressure changes in the enclosure that is serviced by the duct, when there is a leak in the duct between the duct fan and the outlet.

An evaluation, similar to the one described above for the return duct 22, may also be undertaken to determine whether there is a leak in the supply duct 24. Specifically, as shown in FIG. 2C, with the base fan 26 operated in its three different modes, respective airflow measurements for "$f_s$", "$f_{s+}$" and "$f_{s-}$" are taken by the airflow meter 30. A leak in the return duct 22 will then be identified when $f_{s+} < f_s < f_{s-}$.

It is to be noted that FIG. 2A considers only airflow at the inlet 18 and the condition of return duct 22, without mention of the outlet 20 or the supply duct 24. Further, FIG. 2B considers only airflow at the outlet 20 and the condition of supply duct 24, without mention of the inlet 18 or the return duct 22. It happens, however, that if there are leaks both in the return duct 22 and in the supply duct 24, the various airflow measurements would be similar and would resemble a superposition of FIGS. 2B and 2C. In particular, a leak in the return duct 22 will result in the relationship $f_{r-} < f_r < f_{r+}$, and a leak in the supply duct 24 will result in the relationship $f_{s+} < f_s < f_{s-}$. And, this will be so regardless whether only one of the ducts 22/24 has a leak.

Figure 3:
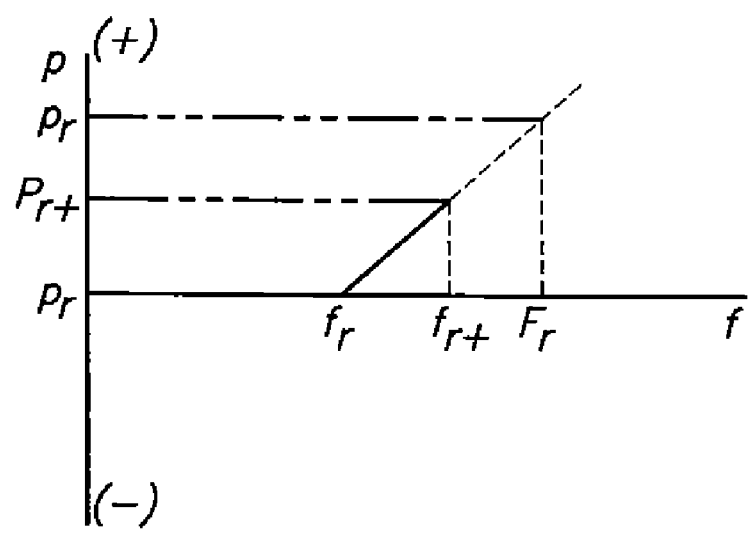
FIG. 3 is a graph illustrating extrapolation techniques for determining a duct fan airflow value.

In another aspect of the present invention, a fan airflow value, $F_r$, can be determined by taking appropriate airflow and pressure measurements in the enclosure 12 and in the duct 14. Refer now to FIG. 3. Specifically, using the pressure sensor 32 upstream from the duct fan 16, the absolute value of a pressure measurement, $P_r$, can be made for the duct fan 16. The airflow and pressure values for an ambient condition at the inlet 18, "$f_r$" and "$p_r$" respectively, and for an overpressure (+) condition, "$f_{r+}$" and enclosure 12 can be made. These values for $f_r$, $p_r$, $f_{r+}$, and $p_{r+}$ can then be plotted as shown in FIG. 3, and extrapolated to $P_r$. The airflow value $F_r$ corresponding to $P_r$ is thus indicative of the fan airflow value.

While the particular System and Method for Determining Duct Leakage and Fan Flow Efficiency as herein shown and disclosed in detail is fully capable of obtaining the objects and providing the advantages herein before stated, it is to be understood that it is merely illustrative of the presently preferred embodiments of the invention and that no limitations are intended to the details of construction or design herein shown other than as described in the appended claims.

What is claimed is:

1. A system for determining "real time" air leakage from a duct in fluid communication with an enclosure, wherein the duct has an inlet and an outlet in fluid communication with the enclosure, said system comprising:
   a duct fan positioned between the duct inlet and the duct outlet and operated in an "on" condition for generating an airflow through the duct;
   a base fan in fluid communication with the enclosure for selectively creating an overpressure (+) in the enclosure and, alternatively, an under pressure (−) in the enclosure, when said base fan is "on"; and
   an airflow meter for measuring a return airflow through the duct inlet, $f_r$, and a supply airflow through the duct outlet, $f_s$, under an initial condition wherein said duct fan is "on" and said base fan is "off" ($f_r$ and $f_s$), and for measuring a return airflow through the duct inlet, $f_{r\pm}$, and a supply airflow through the duct outlet, $f_{s\pm}$, under a condition wherein said duct fan is "on" and said base fan is "on" ($f_{r\pm}$ and $f_{s\pm}$), to identify a substantially leak-free duct when, approximately, $f_s = f_r$ and $f_{r\pm} = f_{s\pm}$, respectively.

2. A system as recited in claim 1 wherein said airflow meter measures the return airflow at the duct inlet with an overpressure in the enclosure, $f_{r+}$, and with an under pressure in the enclosure, $f_{r-}$, to identify a leak in the duct between the duct inlet and the ductfan when $f_{r-} < f_r < f_{r+}$.

3. A system as recited in claim 1 wherein said airflow meter measures the supply airflow at the duct outlet with an overpressure in the enclosure, $f_{r+}$, and with an under pressure in the enclosure, $f_{s-}$, to identify leaks in the duct between the duct fan and the duct outlet when $f_{s+} < f_s < f_{s-}$.

4. A system as recited in claim 1 wherein said airflow meter measures the return airflow at the duct inlet with an overpressure in the enclosure, $f_{r+}$, and with an under pressure in the enclosure, $f_{r-}$, and further wherein said airflow meter measures the supply airflow at the duct outlet with an overpressure in the enclosure, $f_{s+}$, and with an under pressure in the enclosure, $f_{s-}$, to identify leaks in the duct both upstream from the duct fan and downstream from the duct fan when $f_{r-} < f_{r+}$ and $f_{s+} < f_s < f_{s-}$, respectively.

5. A system as recited in claim 1 further comprising:

a first pressure sensor for measuring a return air pressure in the duct immediately upstream from the duct fan, $P_r$;

a second pressure sensor for measuring an air pressure at the inlet of the duct with the base fan "off", $p_r$, and with an overpressure, $p_{r+}$; and a means for extrapolating $p_r$, $p_{r+}$ to $P_r$ with a corresponding $f_r$ and $f_{r+}$ to obtain a fan airflow value $F_r$.

6. A system as recited in claim 1 wherein the duct has a plurality of outlets and said airflow meter measures supply airflows $f_s$ and $f_{s\pm}$ for each outlet.

\* \* \* \* \*

UNITED STATES PATENT AND TRADEMARK OFFICE
CERTIFICATE OF CORRECTION

PATENT NO. : 7,516,649 B2  Page 1 of 1
APPLICATION NO. : 11/371060
DATED : April 14, 2009
INVENTOR(S) : Locke et al.

It is certified that error appears in the above-identified patent and that said Letters Patent is hereby corrected as shown below:

Column 5, Line 53
DELETE
""$f_r$""
INSERT
-- "$f_f$" --

Column 7, Line 6
DELETE
"$f_{r-} < f_{r+}$"
INSERT
-- $f_{r-} < f_r < f_{r+}$ --

Signed and Sealed this

Second Day of June, 2009

JOHN DOLL
*Acting Director of the United States Patent and Trademark Office*